US 6,604,152 B1

(12) United States Patent
Bard et al.

(10) Patent No.: US 6,604,152 B1
(45) Date of Patent: Aug. 5, 2003

(54) EXECUTING PROGRAM INSTALLED IN COMPUTER SLOT IN ONE OF PLURAL ENVIRONMENTS COMPRISING A MAIN OPERATING SYSTEM OR SMALL OPERATING SYSTEM OR NO OPERATING SYSTEM

(75) Inventors: Steve Bard, Vancouver, WA (US); Kelan C. Silvester, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/472,653

(22) Filed: Dec. 27, 1999

(51) Int. Cl.[7] ............................. G06F 13/14; G06F 9/00
(52) U.S. Cl. ........................ 710/16; 710/8; 710/10; 710/15; 710/18; 710/102; 710/103; 713/1; 713/2; 713/323; 713/324
(58) Field of Search .................. 710/8, 10, 16, 710/15, 18, 102, 103; 713/1, 2, 324, 323

(56) References Cited

U.S. PATENT DOCUMENTS

| 5,136,711 | A | * | 8/1992 | Hugard et al. ............... 713/2 |
| 5,359,725 | A | * | 10/1994 | Garcia et al. ............... 707/200 |
| 5,799,187 | A | * | 8/1998 | McBrearty ................... 713/2 |
| 5,887,163 | A | * | 3/1999 | Nguyen et al. ............... 713/2 |
| 6,035,396 | A | * | 3/2000 | Thompson et al. ........... 713/2 |
| 6,295,564 | B1 | * | 9/2001 | Shigetomi et al. ........... 710/74 |
| 6,366,966 | B1 | * | 4/2002 | Laney et al. ................ 710/18 |

* cited by examiner

*Primary Examiner*—Jeffrey Gaffin
*Assistant Examiner*—Tammara Peyton
(74) *Attorney, Agent, or Firm*—Fish & Richardson P.C.

(57) ABSTRACT

Executing a program stored on a device inserted into a computer slot includes determining how to execute the program based on configuration data stored on the device, and executing the program in accordance with the configuration data. Determining may include identifying a type of operating system with which to execute the program based on the configuration data. Executing may include executing the program with the identified operating system.

15 Claims, 6 Drawing Sheets

EXECUTING PROGRAM INSTALLED IN COMPUTER SLOT IN ONE OF PLURAL ENVIRONMENTS COMPRISING A MAIN OPERATING SYSTEM OR SMALL OPERATING SYSTEM OR NO OPERATING SYSTEM

BACKGROUND OF THE INVENTION

This invention relates to executing a program stored on a device installed in a computer slot.

Devices, such as cartridges, can be inserted into computer slots, such as PC (Personal Computer) card slots. Computer programs and data stored on those devices can then be read and/or executed by the computer.

SUMMARY OF THE INVENTION

In general, in one aspect, this invention relates to executing a program stored on a device inserted into a computer slot. This aspect of the invention features determining how to execute the program based on configuration data stored on the device, and executing the program in accordance with the configuration data.

Among the advantages of this aspect of the invention may be one or more of the following. Determining how to execute the program allows the computer to execute the program in a number of different ways. For example, the program can be executed with no operating system, using a small operating system (SOS) such as WindowsCE, or using a main operating system (MOS) such as Windows98. The computer can also determine if the application is to be executed "in place", meaning that it is executed on the device itself, or if the program must be copied to computer memory before execution. By making such determinations beforehand, it is possible to allocate computer resources that are appropriate for the cartridge and, thus, reduce wasted resources.

Other features and advantages will become apparent from the following description, drawings and claims.

DESCRIPTION

Figure 1:
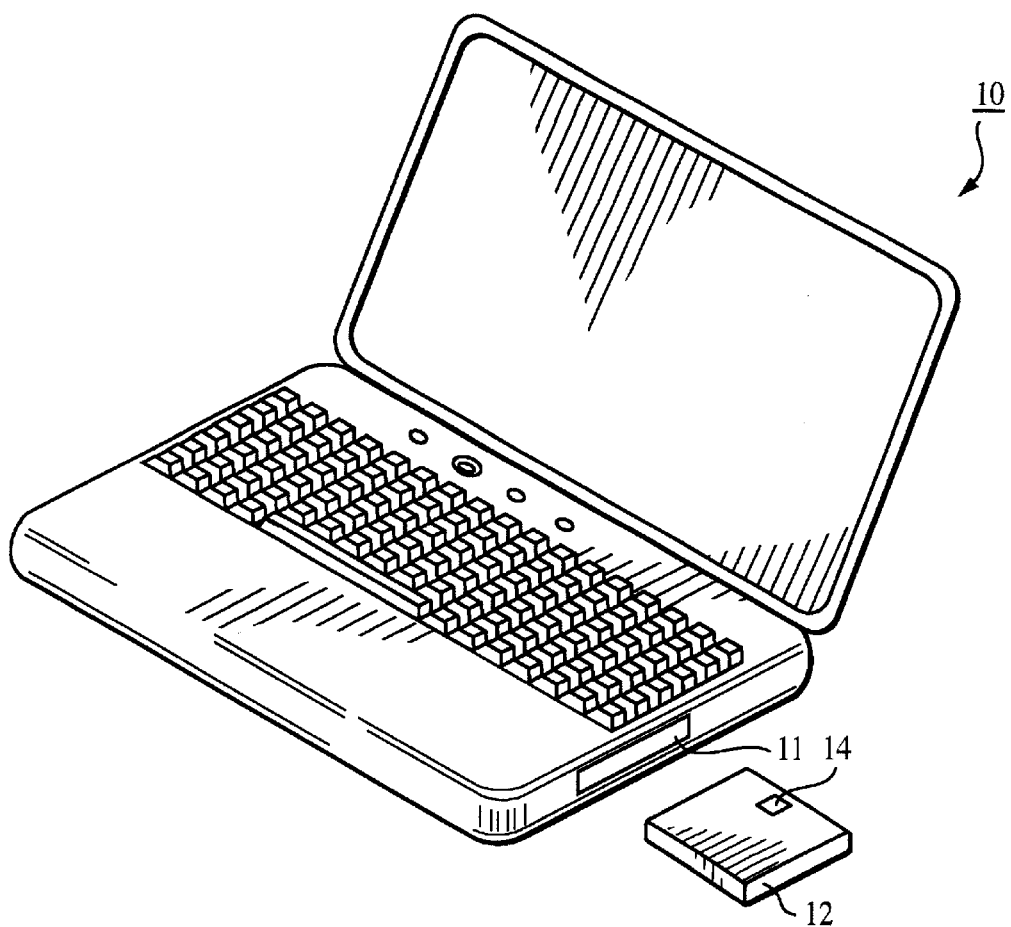
FIG. 1 is a view of a computer on which an embodiment of the invention is implemented.

FIG. 1 shows a notebook computer 10 having a slot 11, into which a cartridge 12 containing data and/or computer program(s) may be inserted. Slot 11 may be a standard PC card slot, a CardBay slot, a Compact Flash slot, or any other type of computer expansion slot.

Cartridge 12 includes a memory 14 which stores configuration data. Memory 14 may be a register, a configuration ROM, or any other type of nonvolatile memory. The configuration data indicates how cartridge 12 is to be used. A slot controller (not shown) in computer 10 reads this configuration data and determines, based on the data, how to read, store and/or execute data on cartridge 12.

For example, the configuration data may specify the type of operating system to be used for executing computer program(s) stored on cartridge 12. In some embodiments, the configuration data may specify that the computer program(s) are to be executed with an SOS, such as WindowsCE, QNX, or VxWorks, or it may specify that the computer program(s) are to be executed with an MOS, such as Windows98.

The configuration data may also specify a location from which program(s) on cartridge 12 are to be executed. For example, the configuration data may specify that the programs are to be executed from cartridge 12 itself (executed in place), or that the program(s) are to be copied to system memory and then executed from there.

Cartridge 12, or portions thereof, may also be used as storage, such as flash memory, for computer 10. In this case, the configuration data may specify that cartridge 12 is to be used as storage. The data may also specify which portions of cartridge 12 are to function as storage.

Figure 2:
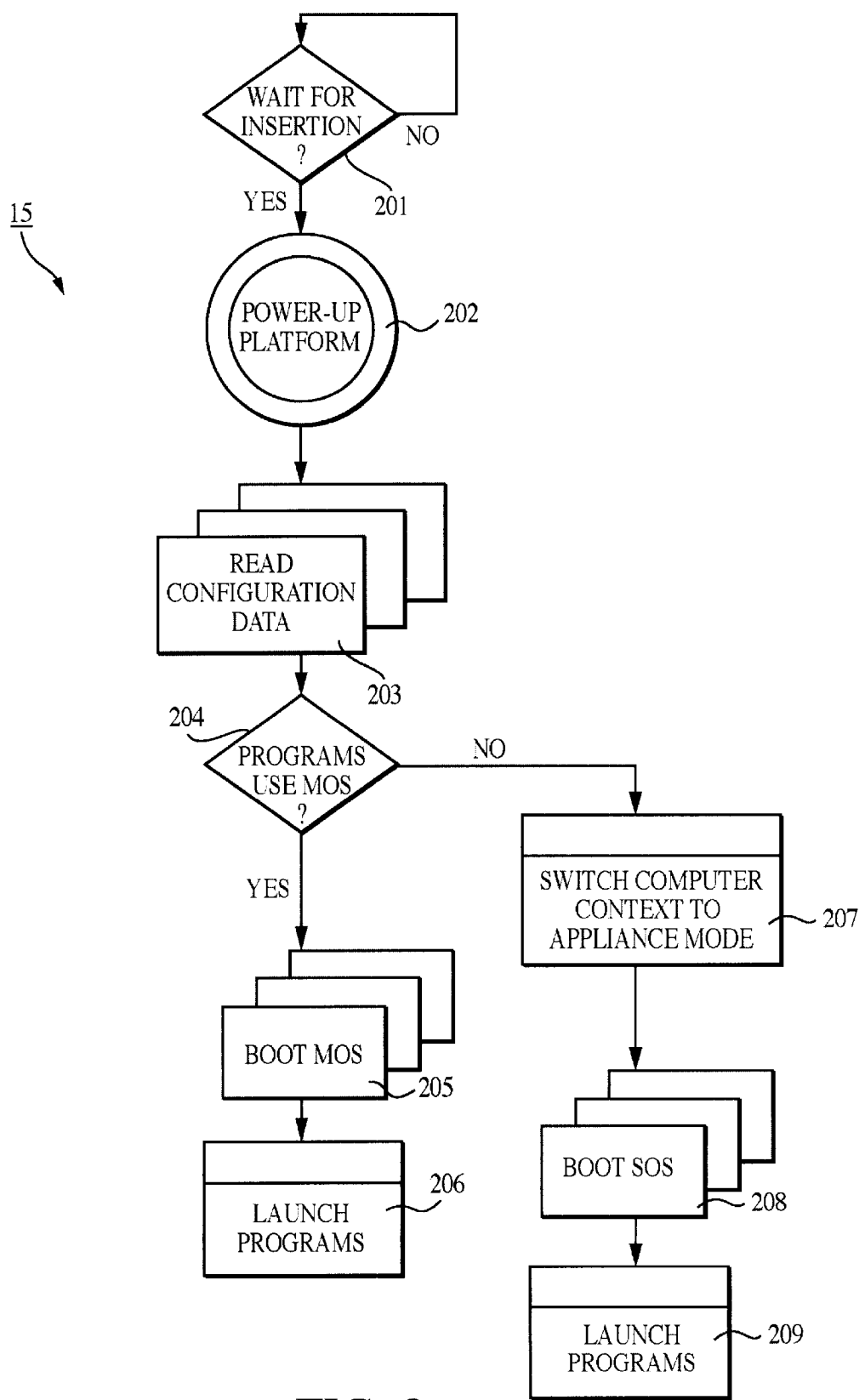
FIG. 2 is a flowchart showing a process for executing program(s) on a cartridge without an operating system currently active.

FIG. 2 shows a process 15 by which the slot controller in computer 10 determines how to use cartridge 12. Process 15 shows a case where there is no active operating system running on computer 10 prior to insertion of cartridge 12. For example, computer 10 may be in a power-down or low-power mode, during which only rudimentary processes, such as process 15, are running.

To begin, process 15 waits (201) for a cartridge to be inserted into slot 11. Once a cartridge 12 has been inserted, process 15 powers-up (202) computer 10 and reads (203) configuration data from cartridge 12. Based on this configuration data, process 15 determines (204) if program(s) stored on cartridge 12 require an SOS or an MOS. If the program(s) require an MOS, process 15 boots (205) the MOS stored on computer 10 and launches (206) the program(s) on cartridge 12 (see FIG. 4). If the program(s) use an SOS, process 15 switches (207) computer 10 to "appliance mode". In appliance mode, computer 10 operates as a stand-alone, single-function device and has limited functionality. For example, in appliance mode, computer 10 executes programs on cartridge 12, performs some rudimentary processes, and little else. Process 15 boots (208) the SOS and launches (209) the program(s) on cartridge 12 (see FIG. 5).

In both SOS and MOS mode, process 15 launches the applications automatically, meaning without user-intervention through a graphical user interface (GUI). Thus, computer 10 appears to the user to have the sole function of the program(s) stored on cartridge 12.

Figure 3:
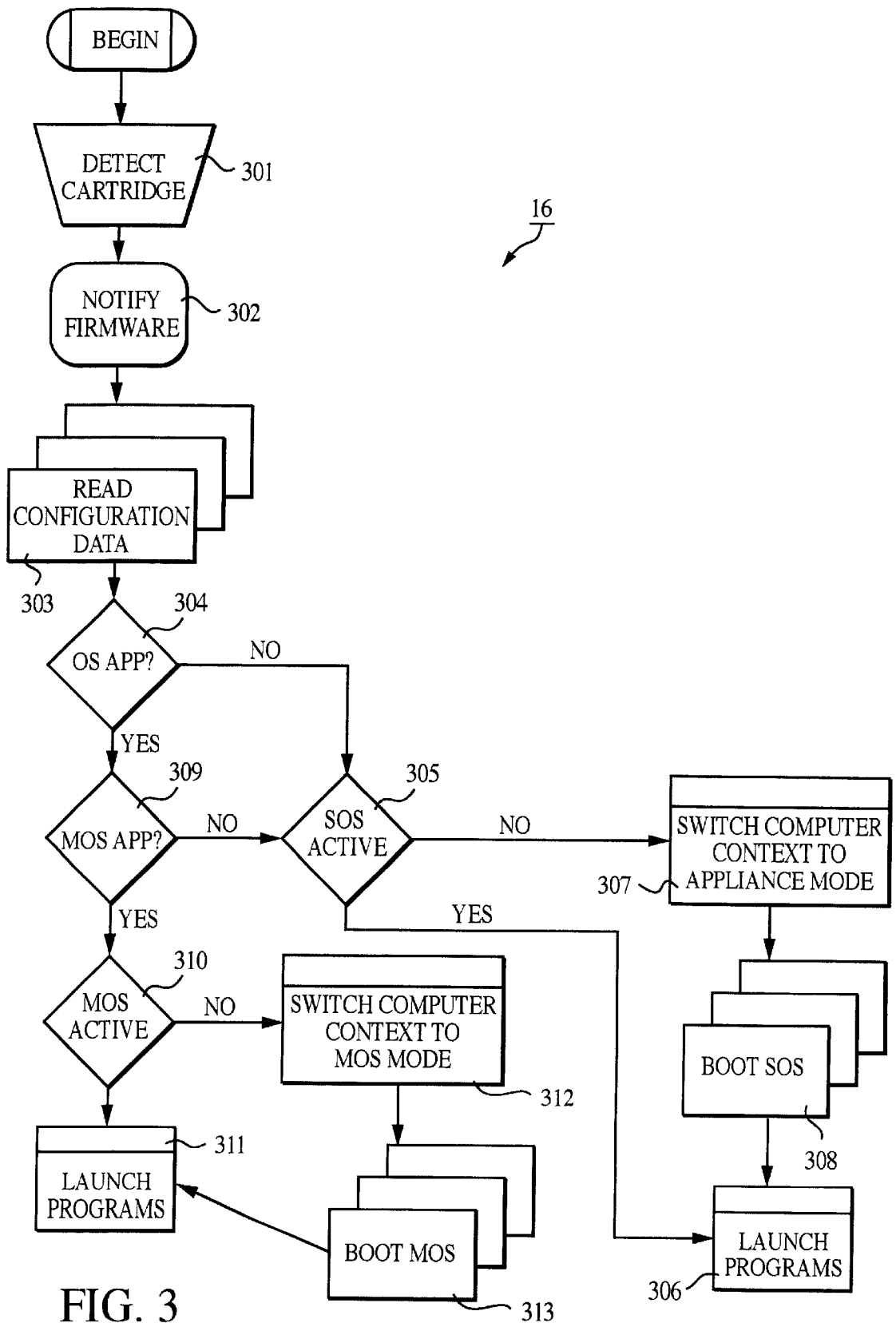
FIG. 3 is a flowchart showing a process for executing program(s) on a cartridge with an operating system currently active.

FIG. 3 shows a process 16 in which there is an active operating system running on computer 10 prior to insertion of cartridge 12. Process 16 begins by detecting (301) a cartridge in slot 11. Once a cartridge has been detected, process 16 notifies (302) firmware in the slot controller (not shown) of computer 10, which performs the remainder of process 16. Process 16 reads (303) the configuration data from cartridge 12 and determines which operating system to use based on this data.

Specifically, process 16 determines (304) if there is a program stored on cartridge 12 that requires an operating system. If not, process 16 determines (305) if an SOS is active. If an SOS is active, process 16 launches (306) program(s) on the cartridge (see FIG. 5). If an SOS is not active, process 16 switches (307) computer 10 to appliance mode, boots (308) the SOS, and launches (306) program(s) on the cartridge.

Following 304, if process 16 determines (309) that there is not a program on cartridge 12 that requires an MOS, process 16 performs 305 to 308, as shown. If there is a program on cartridge 12 that requires an MOS, process 16 proceeds to 310, where it determines if there is currently an MOS active on computer 10. If there is an MOS currently active on computer 10, process 16 launches (311) program (s) on cartridge 12. If there is not an MOS currently active on computer 10 (e.g., if there is an SOS currently active), process 16 switches (312) computer 10 to MOS mode, meaning non-appliance mode, and boots (313) the MOS. Process 16 then launches (311) the program(s) on cartridge 12.

Figure 4:
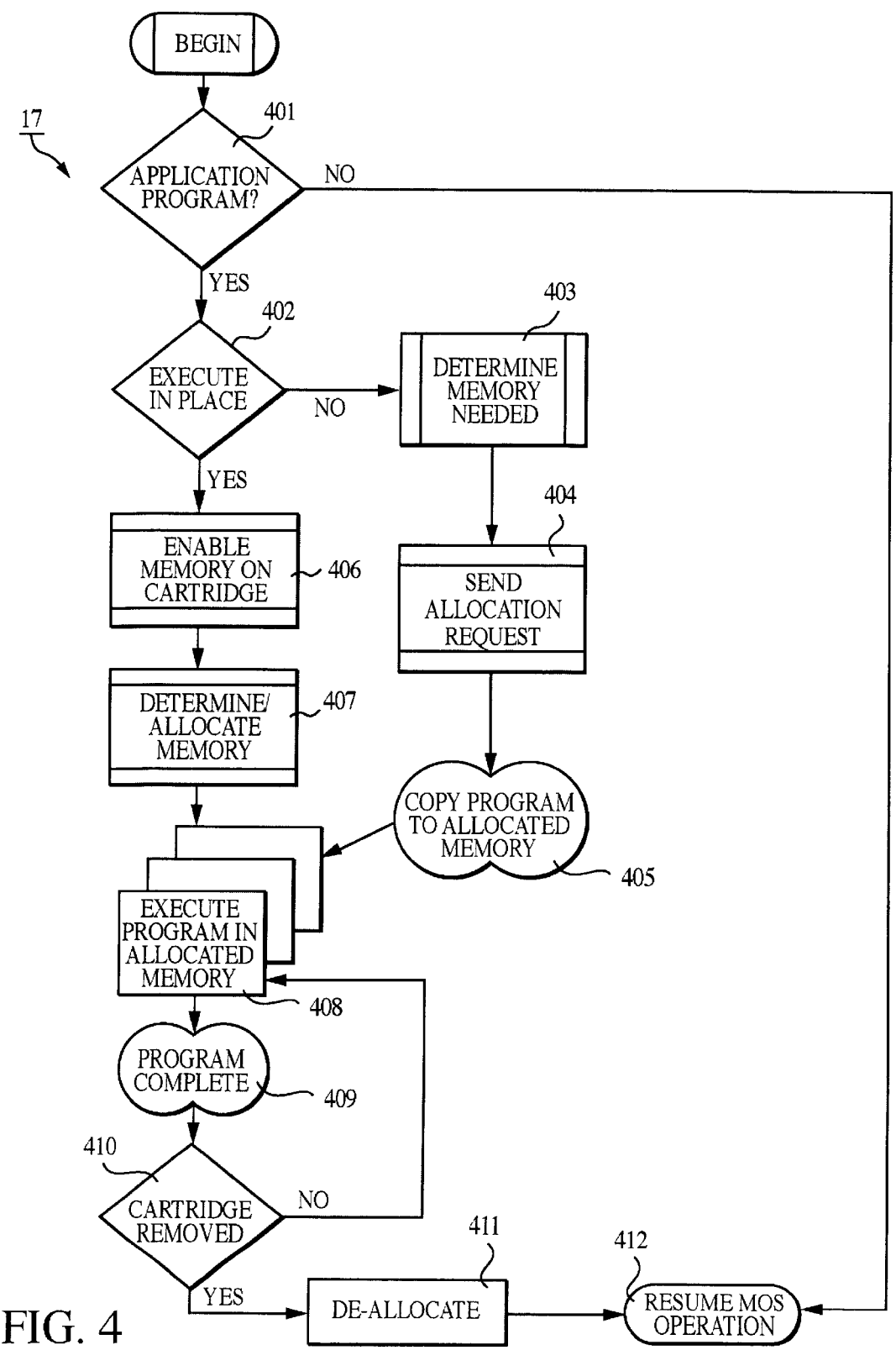
FIG. 4 is a flowchart showing a process for executing the program(s) in an MOS mode.

FIG. 4 shows a process 17 for launching program(s) on cartridge 12 in an MOS environment. Process 17 begins by determining (401) if there is an application program to be executed on cartridge 12. If there is such a program, process 17 determines (402) if the program can be executed from cartridge 12 without an operating system or "executed in place". This information is obtained by reading the configuration data from cartridge 12.

If the program cannot be executed from cartridge 12, process 17 determines (403) an amount of memory needed on computer 10 to execute the program and sends (404) an allocation request to a processor in computer 10 for the required amount of memory. This size of the memory required may be based, e.g., on information in the configuration data and the size of the program(s). Process 17 then copies (405) the program from cartridge 12 to the allocated memory.

Returning to 402, if the program on cartridge 12 can be executed from cartridge 12, process 17 enables (406) memory on cartridge 12 and determines/allocates (407) the amount of memory needed to execute the program. Process 17 then executes (408) the program in the allocated memory space. Once execution of the program has been completed (409) and the cartridge has been removed (410) from slot 11, process 17 de-allocates (411) memory in the MOS for the cartridge program(s) and resumes (412) normal MOS operation. Normal MOS operation also follows if no application program was detected in 411 above.

Figure 5:
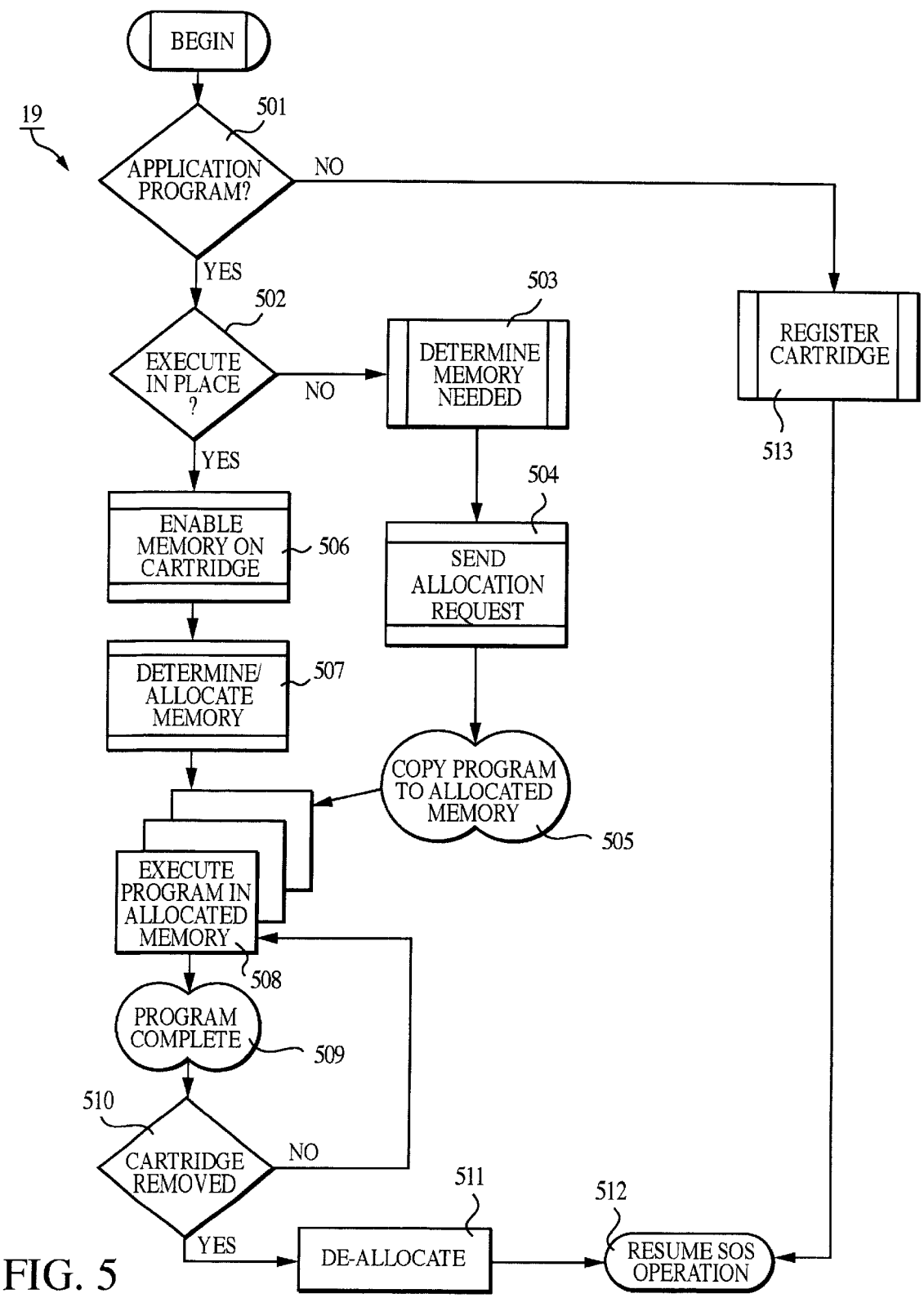
FIG. 5 is a flowchart showing a process for executing the program(s) in an SOS mode.

FIG. 5 shows a process 19 for launching program(s) on cartridge 12 in an SOS environment. Steps 501 to 512 of process 19 are identical to corresponding steps 401 to 412 of process 17, except that an SOS is used in process 19 instead of an MOS. Where the differences lie between processes 17 and 19 is if no application program is detected in 501. In this case, process 19 proceeds to 513. In 513, process 19 registers cartridge 12 with a processor on computer 10 to indicate that the cartridge is available for use as additional (e.g., flash) storage. Thereafter, process 19 resumes normal SOS operations. These operations may include storing data on cartridge 12 when required.

Figure 6:
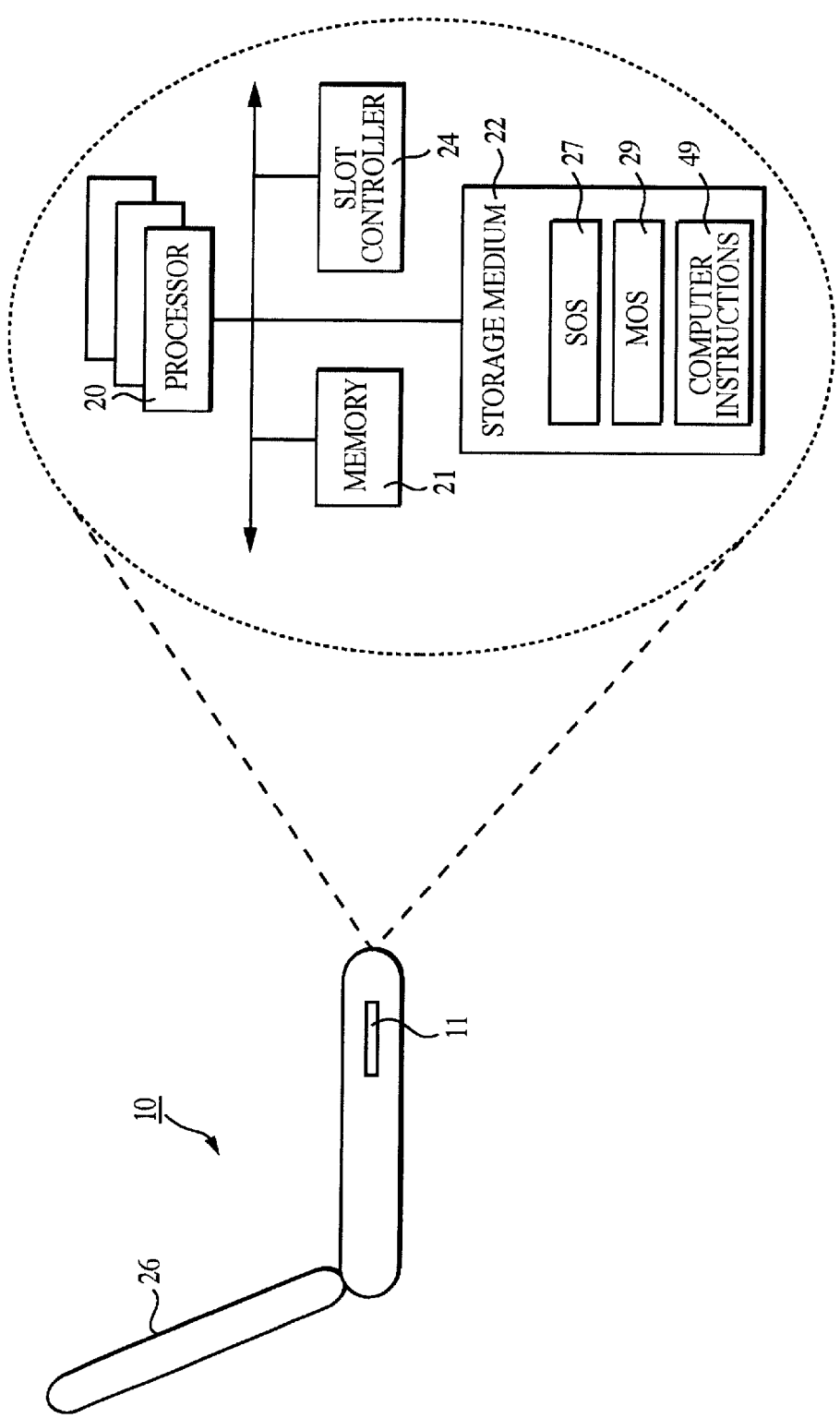
FIG. 6 is a block diagram of components in the computer of FIG. 1.

FIG. 6 shows components of computer 10. Computer 10 includes one or more processors 20, a memory 21, a storage medium 22 (e.g., a hard disk), and a slot controller 24 for detecting cartridges or other devices in a slot 11 (FIG. 1) and for performing processes 15, 16, 17 and/or 19. Storage medium 44 stores computer-executable instructions (firmware) 49 for implementing processes 15, 16, 17 and/or 19, an SOS 27, and an MOS 29. SOS 27 may run on a simple, low-power processor, while MOS 29 may run on a main, higher-power processor.

Processes 15, 16, 17 and/or 19, however, are not limited to use with the hardware or software configuration of FIG. 6; they may find applicability in any computing or processing environment. Processes 15, 16, 17 and 19 may be implemented in hardware, software, or a combination of the two. Processes 15, 16, 17 and 19 may be implemented in computer programs executing on programmable computers that each include a processor, a storage medium readable by the processor (including volatile and non-volatile memory and/or storage elements), at least one input device, and one or more output devices. Program code may be applied to data entered using an input device to perform processes 15, 16, 17 and 19 and to generate output information. The output information may be applied to one or more output devices, such as display screen 26, for viewing by a user.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform processes 15, 16, 17 and 19. Processes 15, 16, 17 and 19 may also be implemented as a computer-readable storage medium, configured with a computer program, where, upon execution, instructions in the computer program cause the computer to operate in accordance with processes 15, 16, 17 and 19.

Other embodiments not described herein are also within the scope of the following claims. For example, the foregoing embodiments have been described in the context of a notebook computer. However, the invention can be applied on any type of computer, including, but not limited to, laptops, desktops, and hand-held devices. The invention is also not limited to use with cartridge-type storage devices. The invention can be used to execute any type of program, from business applications such as spreadsheets to computer games. The invention can also be used with MOS and SOS operating systems other than those described above.

What is claimed is:

1. A method of executing a program stored on a device inserted into a computer slot, comprising
    determining one of plural available environments in which to execute the program based on configuration data stored on the device, the plural environments comprising a main operating system, a small operating system, and no operating system, the small operating system providing limited functionality and the main operating system providing increased functionality relative to the small operating system; and
    executing the program in a determined one of the plural available environments.

2. The method of claim 1, wherein:
    determining comprises identifying a type of operating system with which to execute the program based on the configuration data; and
    executing comprises executing the program with the identified operating system.

3. The method of claim 2, wherein the type of operating system is identified by reading the configuration data from a memory on the device.

4. The method of claim 2, wherein executing comprises executing the program automatically following boot-up of the identified operating system.

5. The method of claim 1, wherein determining comprises determining whether to execute the program from the device or to copy the program to memory and to execute the program from the memory.

6. An article comprising a computer-readable medium which stores computer-executable instructions for executing a program stored on a device inserted into a computer slot, the instructions causing a computer to:

determine one of plural available environments in which to execute the program based on configuration data stored on the device, the plural environments comprising a main operating system, a small operating system, and no operating system, the small operating system providing limited functionality and the main operating system providing increased functionality relative to the small operating system; and execute the program in a determined one of the plural available environments.

7. The article of claim 6, wherein:

determining comprises identifying a type of operating system with which to execute the program based on the configuration data; and executing comprises executing the program with the identified operating system.

8. The article of claim 7, wherein the type of operating system is identified by reading the configuration data from a memory on the device.

9. The article of claim 7, wherein executing comprises executing the program automatically following boot-up of the identified operating system.

10. The article of claim 6, wherein determining comprises determining whether to execute the program from the device or to copy the program to memory and to execute the program from the memory.

11. An apparatus for executing a program stored on a device inserted into the apparatus, comprising:

a memory which stores executable instructions; and a controller which executes the instructions to (i) determine one of plural available environments in which to execute the program based on configuration data stored on the device, the plural environments comprising a main operating system, a small operating system, and no operating system, the small operating system providing limited functionality and the main operating system providing increased functionality relative to the small operating system, and (ii) execute the program in a determined one of the plural available environments.

12. The apparatus of claim 11, wherein:

determining comprises identifying a type of operating system with which to execute the program based on the configuration data; and executing comprises executing the program with the identified operating system.

13. The apparatus of claim 12, wherein the type of operating system is identified by reading the configuration data from a memory on the device.

14. The apparatus of claim 12, wherein executing comprises executing the program automatically following boot-up of the identified operating system.

15. The apparatus of claim 11, wherein determining comprises determining whether to execute the program from the device or to copy the program to memory and to execute the program from the memory.

* * * * *